US012617003B2

(12) United States Patent
Liu

(10) Patent No.: US 12,617,003 B2
(45) Date of Patent: May 5, 2026

(54) DISPENSING APPARATUS

(71) Applicant: Illinois Tool Works Inc., Glenviw, IL (US)

(72) Inventor: Guohua Liu, Suzhou New District (CN)

(73) Assignee: Illinois Tool Works Inc., Glenview, IL (US)

( * ) Notice: Subject to any disclaimer, the term of this patent is extended or adjusted under 35 U.S.C. 154(b) by 422 days.

(21) Appl. No.: 17/908,782

(22) PCT Filed: Mar. 2, 2021

(86) PCT No.: PCT/US2021/020518

§ 371 (c)(1),
(2) Date: Sep. 1, 2022

(87) PCT Pub. No.: WO2021/178436

PCT Pub. Date: Sep. 10, 2021

(65) Prior Publication Data

US 2023/0126512 A1 Apr. 27, 2023

(30) Foreign Application Priority Data

Mar. 3, 2020 (CN) ......................... 202010139401.0

(51) Int. Cl.
*B08B 5/02* (2006.01)
*B08B 15/00* (2006.01)

(52) U.S. Cl.
CPC ............ *B08B 5/023* (2013.01); *B08B 15/005* (2013.01); *B08B 2205/00* (2013.01)

(58) Field of Classification Search
CPC ........... B08B 5/043; B08B 5/023; B08B 5/02; A47L 9/02

(Continued)

(56) References Cited

U.S. PATENT DOCUMENTS 6,290,361 B1 * 9/2001 Berzin .................... B60S 1/544 359/507
6,513,192 B1 * 2/2003 Pearlstein ............. A47L 7/0009 D32/32

(Continued)

FOREIGN PATENT DOCUMENTS

AT 574 U1 1/1996
CN 201841091 U 5/2011

(Continued)

OTHER PUBLICATIONS

Translation of JP2002246409 (Year: 2002).*
Int'l Search Report and Written Opinion Appln No. PCT/US2021/020518 mailed Jun. 21, 2021.

*Primary Examiner* — Tom Rodgers
(74) *Attorney, Agent, or Firm* — Lando & Anastasi, LLP

(57) ABSTRACT

The present application provides a dispensing apparatus for processing an electronic component, comprising: a first track component and a second track component, a first flow-guiding component and a second flow-guiding component, the first flow-guiding component being arranged at the top of the first track component, the second flow-guiding component being arranged at the top of the second track component, the first flow-guiding component having at least one first gas inlet and at least one first gas outlet in communication with each other, the at least one first gas inlet being configured to be in communication with a clean gas source, the second flow-guiding component having at least one second gas inlet and at least one second gas outlet in communication with each other, the at least one second gas inlet being arranged facing the first gas outlet, and the at least one second gas outlet being configured to be in communication with a gas discharge motive power apparatus, so that clean gas can flow toward the at least one second gas inlet from the at least one first gas outlet, thereby (Continued)

forming a clean gas region above the electronic component to be processed, to avoid contamination with impurities during processing.

6 Claims, 8 Drawing Sheets

(58) Field of Classification Search
USPC .................................... 15/306.1, 345, 346
See application file for complete search history.

(56) References Cited

U.S. PATENT DOCUMENTS

| | | | | |
|---|---|---|---|---|
| 2003/0142403 | A1 | 7/2003 | Kalley | |
| 2006/0274292 | A1 | 12/2006 | Hasegawa | |
| 2007/0002292 | A1 | 1/2007 | Vogel | |
| 2008/0135182 | A1 * | 6/2008 | Nishikawa | H05K 13/0061 156/536 |
| 2009/0169342 | A1 | 7/2009 | Yoshimura | |
| 2015/0132483 | A1 | 5/2015 | Doyle | |
| 2016/0052074 | A1 | 2/2016 | Hueste | |

FOREIGN PATENT DOCUMENTS

| | | | |
|---|---|---|---|
| CN | 202539001 | U | 11/2012 |
| CN | 204148046 | U | 2/2015 |
| CN | 104550177 | A | 4/2015 |
| CN | 104690036 | A | 6/2015 |
| CN | 205887308 | U | 1/2017 |
| CN | 205974952 | U | 2/2017 |
| CN | 110743744 | A | 2/2020 |
| JP | s60-259815 | A | 12/1985 |
| JP | H02-148826 | A | 6/1990 |
| JP | 2002-246409 | A | 8/2002 |
| JP | 2008100822 | | 5/2008 |
| JP | 2008-147386 | A | 6/2008 |
| KR | 20100079524 | | 7/2010 |
| KR | 10-2011-0095029 | A | 8/2011 |

* cited by examiner

DISPENSING APPARATUS

RELATED APPLICATIONS

This application is a U.S. National Phase Application under 35 U.S.C. § 371 of International Application No. PCT/US2021/020518 filed Mar. 2, 2021, which claims the benefit of Chinese Patent Application No. 202010139401.0, filed Mar. 3, 2020. The entire contents of the foregoing applications are hereby incorporated herein by reference.

FIELD

The present application relates to a dispensing apparatus, in particular to a dispensing apparatus for use in the field of electronic component processing.

BACKGROUND

In the field of electronic component processing, it is necessary to use a dispensing apparatus to dispense fluid droplets onto electronic component surfaces or into electronic components; in the process of fluid dispensing, if dust or impurities contaminate the fluid or a region of the electronic component where processing is to be performed, the quality of processing of the electronic component will be affected. Thus, it is necessary to ensure the cleanliness of air in a processing region of the electronic component, to avoid contamination by dust or impurities as far as possible.

SUMMARY

The present application provides a dispensing apparatus, which can effectively avoid contamination with dust or impurities during operation. The dispensing apparatus comprises: a first track component and a second track component, the first track component and the second track component being arranged in parallel, and being configured to carry an electronic component to be processed; a first flow-guiding component and a second flow-guiding component, the first flow-guiding component being arranged at the top of the first track component, the second flow-guiding component being arranged at the top of the second track component, the first flow-guiding component having a first inner side part, the second flow-guiding component having a second inner side part, the first inner side part and the second flow-guiding component inner side part being arranged facing toward each other; wherein the first flow-guiding component has at least one first gas inlet and at least one first gas outlet in communication with each other, the at least one first gas inlet being configured to be in communication with a clean gas source, and the at least one first gas outlet being arranged at the first inner side part of the first flow-guiding component; the second flow-guiding component has at least one second gas inlet and at least one second gas outlet in communication with each other, the at least one second gas inlet being arranged at the second inner side part of the second flow-guiding component, and the at least one second gas outlet being configured to be in communication with a gas discharge motive power apparatus, so that clean gas can flow toward the at least one second gas inlet from the at least one first gas outlet, thereby forming a clean gas region above the electronic component to be processed.

In the dispensing apparatus described above, the first flow-guiding component has at least one lead-out channel corresponding to the at least one first gas outlet respectively, the at least one lead-out channel being formed to extend into the interior of the first flow-guiding component from the at least one first gas outlet, and the height of the lead-out channel in a length direction perpendicular to the first track component gradually decreasing from the at least one first gas outlet toward the inside.

In the dispensing apparatus described above, the at least one first gas outlet comprises multiple gas outlets and multiple lead-out channels corresponding to the multiple gas outlets respectively, the multiple gas outlets being distributed in a length direction of the first flow-guiding component.

In the dispensing apparatus described above, the first flow-guiding component has a first accommodating cavity, the first accommodating cavity extending in a length direction of the first flow-guiding component and being in communication with the at least one first gas inlet and the at least one lead-out channel.

In the dispensing apparatus described above, the distance between outer sides of the first and last of the multiple gas outlets in the length direction of the first flow-guiding component is greater than or equal to the length of an electronic component to be processed.

In the dispensing apparatus described above, the second flow-guiding component has at least one lead-in channel corresponding to the at least one second gas inlet, the at least one lead-in channel being formed to extend into the interior of the second flow-guiding component from the second gas inlet, and the height of the at least one lead-in channel in a length direction perpendicular to the second track component gradually decreasing from the second gas inlet toward the inside.

In the dispensing apparatus described above, the at least one second gas inlet comprises multiple gas inlets and multiple lead-in channels corresponding to the multiple gas inlets respectively, the multiple gas inlets being distributed in a length direction of the second flow-guiding component;

the second flow-guiding component has a second accommodating cavity, the second accommodating cavity extending in a length direction of the second flow-guiding component and being in communication with the at least one second gas outlet and the at least one lead-in channel.

In the dispensing apparatus described above, the distance between an inner side of the first flow-guiding component and an inner side of the second flow-guiding component is less than the width of the electronic component to be processed.

The dispensing apparatus described above further comprises:

an air filtration apparatus, the air filtration apparatus comprising an inlet end and an outlet end, the inlet end being in communication with an air source, the outlet end being in communication with the at least one first gas inlet, and the air filtration apparatus being configured to supply clean air to the first flow-guiding component.

The dispensing apparatus described above further comprises:

a gas treatment apparatus, the gas treatment apparatus being in communication with the second gas outlet, and the gas treatment apparatus being capable of purifying air flowing out of the second gas outlet.

The dispensing apparatus provided in the present application can form a clean gas region in a region where an electronic component is to be processed, to avoid contamination with dust and impurities. The dispensing apparatus provided in the present application comprises a pair of flow-guiding components, and is capable of effectively utilizing clean gas, reducing the amount of clean gas used, and ensuring the cleanliness of air in a processing region.

DETAILED DESCRIPTION

Figure 1A:
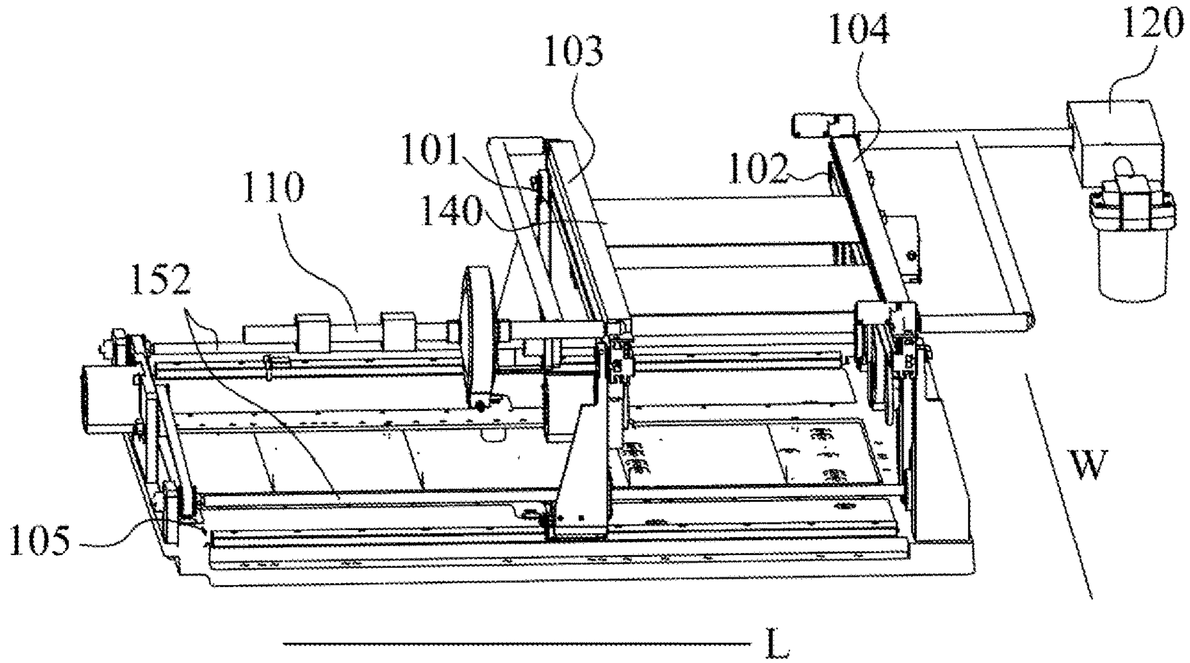
FIG. 1A is a three-dimensional schematic drawing of the dispensing apparatus in an embodiment of the present application.

Various particular embodiments of the present application are described below with reference to the accompanying drawings, which form part of this Description. It should be understood that although terms indicating direction, such as "front", "rear", "up", "down", "left" and "right" etc. are used in the present application to describe various demonstrative structural parts and elements of the present application, these terms are used here purely in order to facilitate explanation, and are determined on the basis of demonstrative orientations shown in the drawings. Since the embodiments disclosed in the present application may be arranged in accordance with different directions, these terms indicating direction are purely illustrative, and should not be regarded as limiting.

Figure 1B:
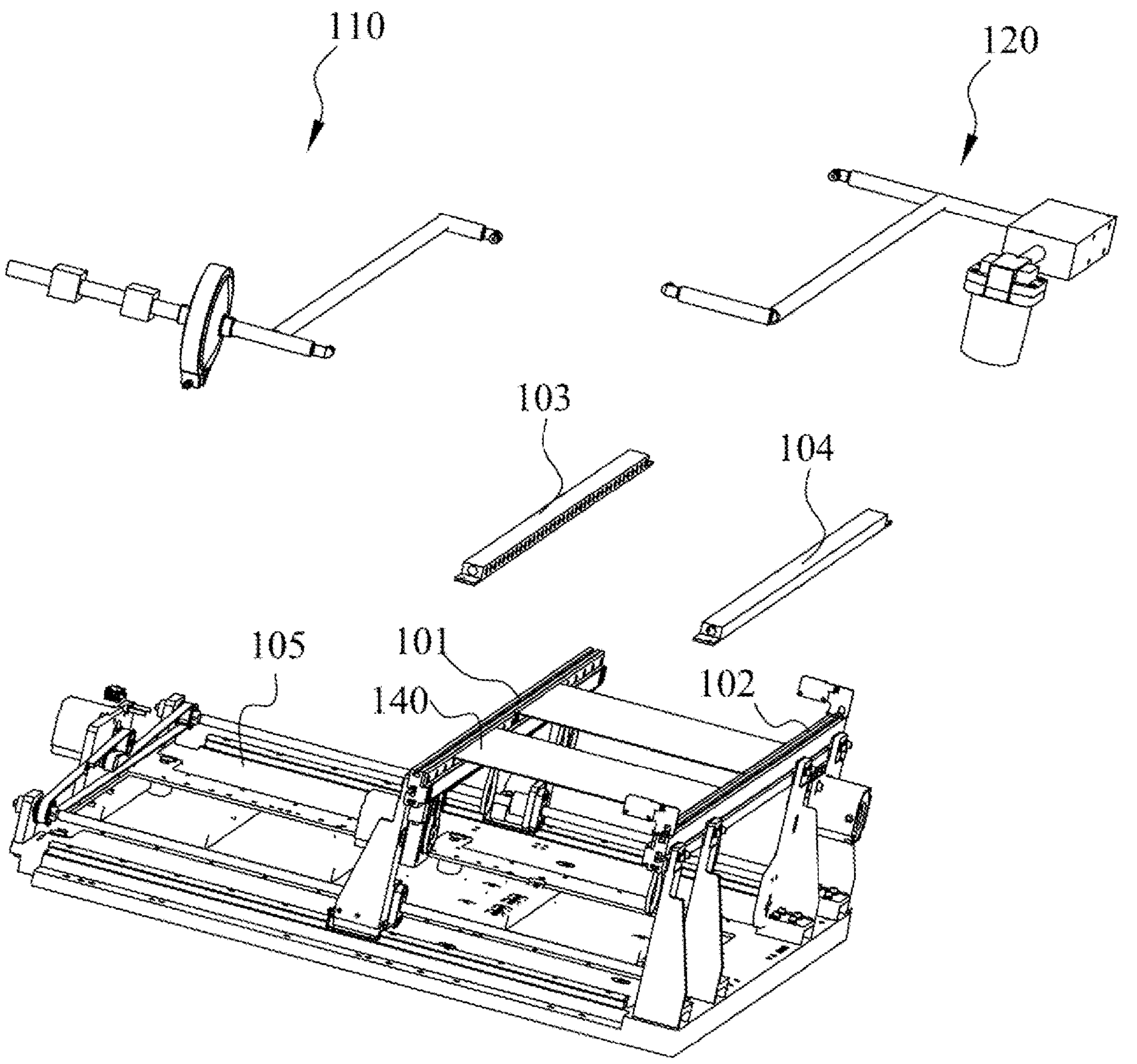
FIG. 1B is an exploded view of the dispensing apparatus in FIG. 1A.

FIG. 1A is a dispensing apparatus in an embodiment of the present application; in FIG. 1A, only a part of the dispensing apparatus is shown, in order to show the inventive features of the present application more clearly; FIG. 1B is an exploded view of the dispensing apparatus in FIG. 1A. The dispensing apparatus is used for processing an electronic component, such as a circuit board. The dispensing apparatus dispenses a fluid such as solder paste or silicone grease above the electronic component, and dots or spreads the fluid onto a surface of the electronic component or into the interior thereof, in order to process the electronic component. In the process of the electronic component being processed by the dispensing apparatus, air inside the dispensing apparatus might be contaminated with impurities such as dust, but regions of the electronic component where processing is to be performed require air of relatively high cleanliness; thus, if dust in the air enters a region of the electronic component where processing is being performed or the fluid to be dispensed, the quality of the electronic component might be affected. The dispensing apparatus provided in the present application can mitigate this problem. FIGS. 1A and 1B show part of the dispensing apparatus; in order to make it easier to show the structure capable of improving the cleanliness of air close to the electronic component in the present application, FIGS. 1A and 1B omit a dispensing assembly, a housing and some of the other assemblies of the dispensing apparatus. As shown in FIGS. 1A and 11B, the dispensing apparatus comprises a base 105, a first track component 101 and a second track component 102, a first flow-guiding component 103 and a second flow-guiding component 104, a gas delivery assembly 110 and a gas discharge assembly 120. The first track component 101 and second track component 102 are used to carry and transport an electronic component 140 to be processed; two sides of the electronic component 140 to be processed are in contact with the first track component 101 and second track component 102 respectively. The base 105 has a length direction L and a width direction W; the first track component 101 and second track component 102 are arranged in parallel on the base 105 in the width direction W. The second track component 102 is connected to the base 105 in a fixed manner, and arranged at one side edge of the base 105. The base 105 comprises a pair of slide rails 152 extending in the length direction L; the first track component 101 is slidably connected to the base 105 by means of the pair of slide rails 152, such that the first track component 101 can slide in the length direction L of the base 105, thereby adjusting a width between the first track component 101 and second track component 102, in order to adapt to electronic components of different specifications.

The first flow-guiding component 103 is connected to the top of the first track component 101; the second flow-guiding component 104 is connected to the top of the second track component 102. The gas delivery assembly 110 is in communication with the first flow-guiding component 103, and the gas delivery assembly 110 can supply clean air to the first flow-guiding component 103. The gas discharge assembly 120 is in communication with the second flow-guiding component 104, and the gas discharge assembly 120 can draw in and discharge gas in the second flow-guiding component 104. Under the action of the gas delivery assembly 110 and gas discharge assembly 120, clean air flows toward the second flow-guiding component 104 from the first flow-guiding component 103, to form a clean air region above the electronic component 140 to be processed, in order to protect the electronic component 140 such that it suffers no interference from impurities such as dust, or suffers as little such interference as possible, during processing.

Figure 2A:
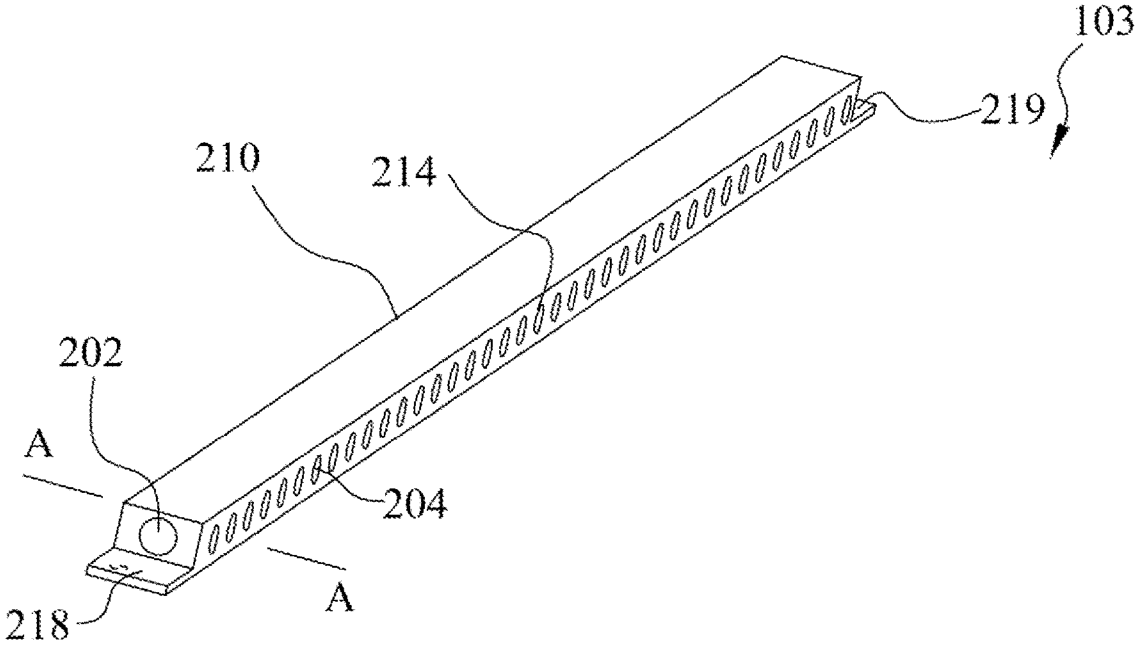
FIG. 2A is a three-dimensional drawing of the first flow-guiding component 103 in FIG. 1B.

FIG. 2A is a three-dimensional drawing of the first flow-guiding component 103 in FIG. 1B; as shown in FIG. 2A, the first flow-guiding component 103 is substantially in the form of a long strip, and has a main body 210 and connecting parts 218 and 219; the connecting parts 218 and 219 extend outward from two ends in a length direction of the main body 210 respectively, and the connecting parts 218 and 219 are used for connection to the first flow-guiding component 103. The first flow-guiding component 103 has a first inner side part 214; when the first flow-guiding component 103 is mounted on the first track component 101, the first inner side part 214 faces toward the second flow-guiding component 104. The two ends in the length direction of the main body 210 of the first flow-guiding component 103 are provided with a pair of first gas inlets 202, and the first inner side part 214 is provided with multiple first gas outlets 204; the pair of first gas inlets 202 are in communication with the multiple first gas outlets 204. The pair of first gas inlets 202 are configured to be in communication with the gas delivery assembly 110, to lead clean air into the first flow-guiding component 103, and the clean air can be discharged from the first gas outlets 204.

In an embodiment of the present application, the first flow-guiding component 103 is of substantially the same length as the first track component 101. The multiple first gas outlets 204 are distributed in the length direction of the first flow-guiding component 103; the first and last of the multiple gas outlets are close to two ends in the length direction of the first flow-guiding component 103 respectively, such that the length of a clean gas region capable of being produced by the multiple gas outlets 204 is close to the length of the first track component 101. The length of the clean gas region is at least no less than the length of an electronic component to be processed, to ensure that a sufficiently large clean gas region is formed above the electronic component to be processed.

Figure 2B:
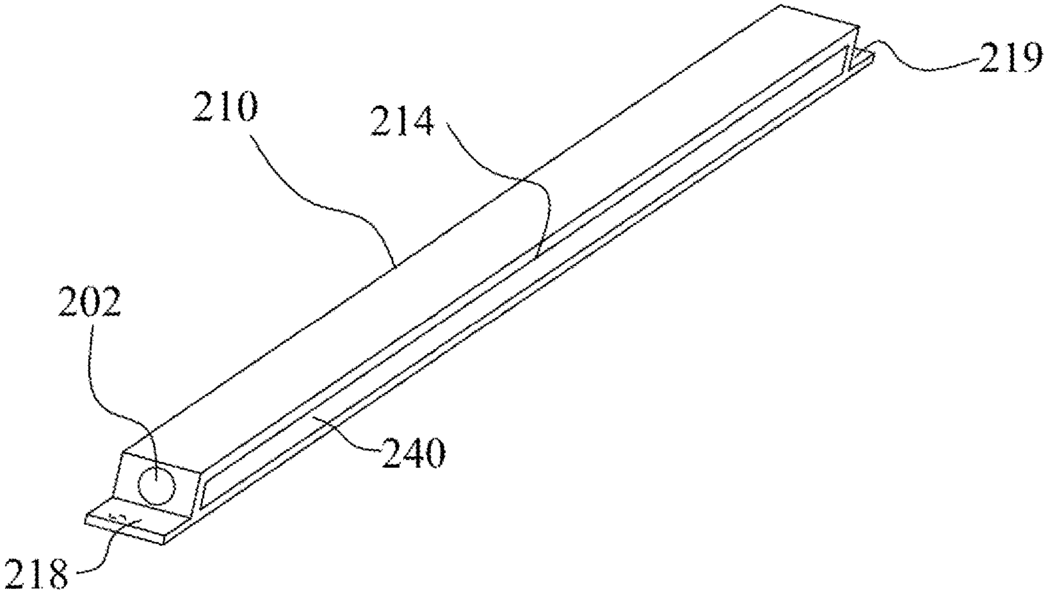
FIG. 2B is a three-dimensional drawing of another embodiment of the first flow-guiding component 103.

FIG. 2B is another embodiment of the flow-guiding component of the present application, and is similar to the embodiment shown in FIG. 2A, the difference being that a single first gas outlet 240 is provided, extending in the length direction of the first flow-guiding component 103, thereby forming a first gas outlet in the form of a long strip, the length of the first gas outlet being no less than the length of an electronic component to be processed; the first gas outlet in this embodiment can also form a certain clean gas region.

Figure 3:
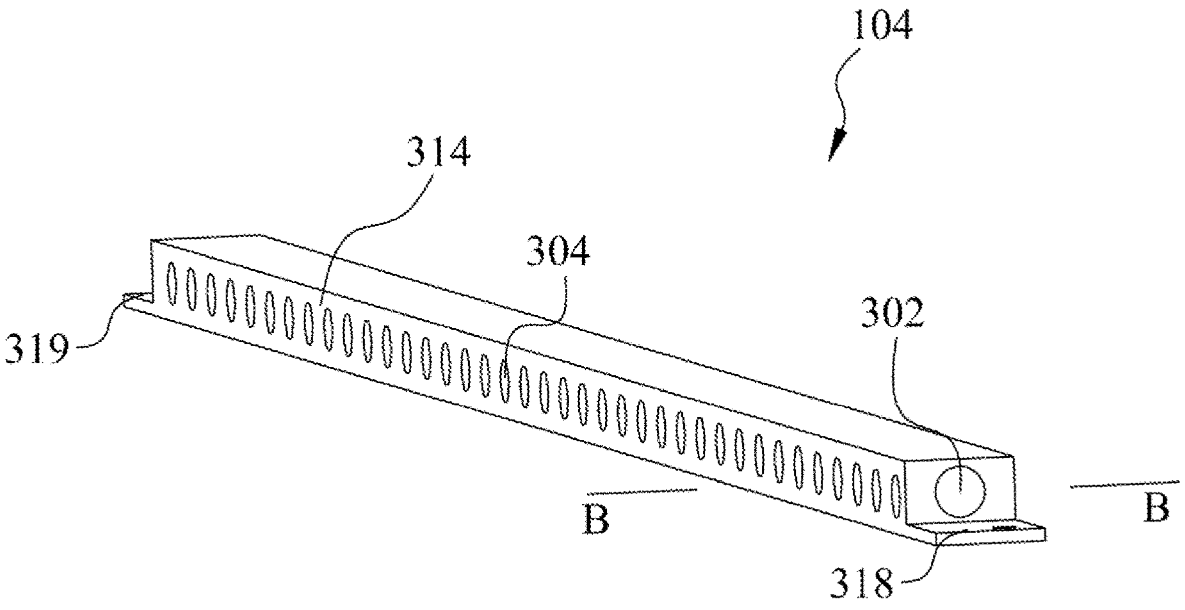
FIG. 3 is a three-dimensional drawing of the second flow-guiding component 104 in FIG. 1B.

FIG. 3 is a three-dimensional drawing of the second flow-guiding component 104 in FIG. 1B, the structure of the second flow-guiding component 104 being similar to the structure of the first flow-guiding component 103; as shown in FIG. 3, the second flow-guiding component 104 is substantially in the form of a long strip, and has a main body 310 and connecting parts 318 and 319; the connecting parts 318 and 319 extend outward from two ends in a length direction of the main body 310 respectively, and the connecting parts 318 and 319 are used for connection to the second flow-guiding component 104. The second flow-guiding component 104 has a second inner side part 314; when the second flow-guiding component 104 is mounted on the second track component 102, the second inner side part 314 faces toward the first flow-guiding component 103. That is to say, the first inner side part 214 and second inner side part 314 are arranged facing toward each other. The two ends in the length direction of the main body 310 of the second flow-guiding component 104 are provided with a pair of second gas outlets 302, and the second inner side part 314 is provided with multiple second gas inlets 304; the pair of second gas outlets 302 are in communication with the multiple second gas inlets 304. The pair of second gas outlets 302 are configured to be in communication with the gas discharge assembly 120, such that clean air is led into the second flow-guiding component 104 through the second gas inlets 304, and discharged from the second gas outlets 302. The second flow-guiding component 104 and first flow-guiding component 103 are structurally symmetric, but have different internal flow directions of gas.

In the present application, the second flow-guiding component 104 and first flow-guiding component 103 are arranged symmetrically, but in other embodiments, the second flow-guiding component may also be structurally different from the first flow-guiding component 103; for example, the number and sizes of second gas inlets 304 are different from the number and sizes of first gas outlets 204, as long as the second gas inlets 304 are arranged at the second inner side part 314. The second gas inlet 304 may also be a single inlet extending in the length direction, or a combination of multiple inlets of different sizes.

Figure 4A:
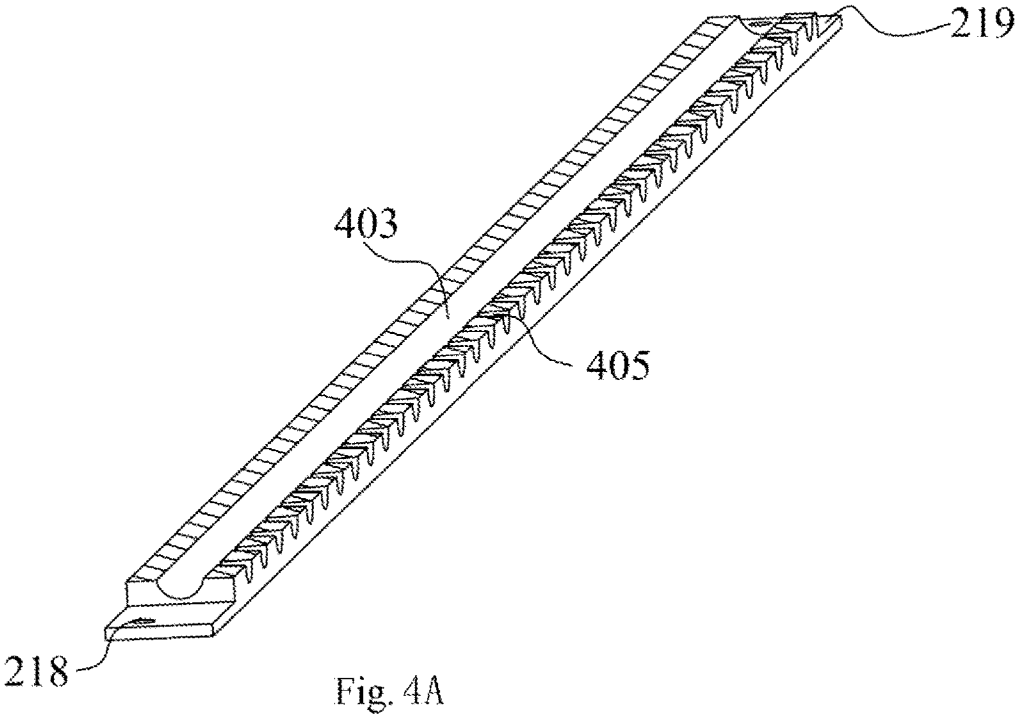
FIG. 4A is a three-dimensional drawing of the first flow-guiding component in FIG. 2A, cut in the length direction.
Figure 4B:
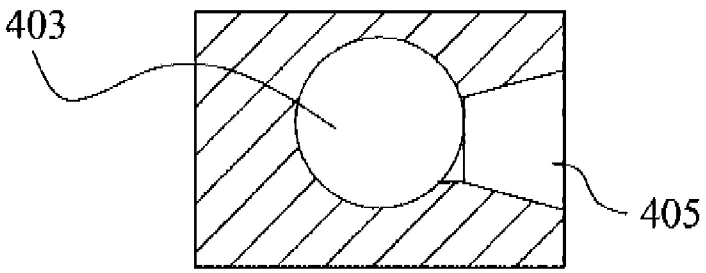
FIG. 4B is a sectional drawing of the first flow-guiding component in FIG. 2A.

FIG. 4A is a three-dimensional drawing of the first flow-guiding component in FIG. 2A, cut in the length direction; FIG. 4B is a transverse sectional drawing of the first flow-guiding component in FIG. 2A, cut along line A-A. As shown in FIG. 4A, the first flow-guiding component 103 has a first accommodating cavity 403 and multiple lead-out channels 405, the first accommodating cavity 403 being in communication with the multiple lead-out channels 405. The multiple lead-out channels 405 extend inward to the first accommodating cavity 403 from the corresponding first gas outlets 204; the two first gas inlets 202 are arranged at two ends of the first accommodating cavity 403, and each of the multiple first gas outlets 204 is in communication with the first gas inlets 202 by means of the corresponding lead-out channels 405 and the first accommodating cavity 403. It must be explained that the positions and number of first gas inlets 202 can be set according to design needs; one or more first gas inlets may be provided, and may be arranged in any region of a surface of the first flow-guiding component 103, as long as they are in communication with the first accommodating cavity 403.

As shown in FIG. 4B, the lead-out channel 405 narrows gradually from the corresponding first gas outlet 204 toward the inside (i.e. toward the first accommodating cavity 403), such that the lead-out channel 405 has a flared shape that gradually increases in size from the inside to the outside; this will help gas to have a divergent form when leaving the first gas outlet 204, so as to be able to fill the space above the electronic component as much as possible. The lead-out channel 405 need not have a regular flared shape, as long as the height in a length direction perpendicular to the first track component 101 gradually decreases from the outside to the inside; that is to say, the effect of guiding gas flow can be achieved if the lead-out channel 405 gradually decreases in size from the inside to the outside in an axial cross section of the first flow-guiding component 103.

Figure 5A:
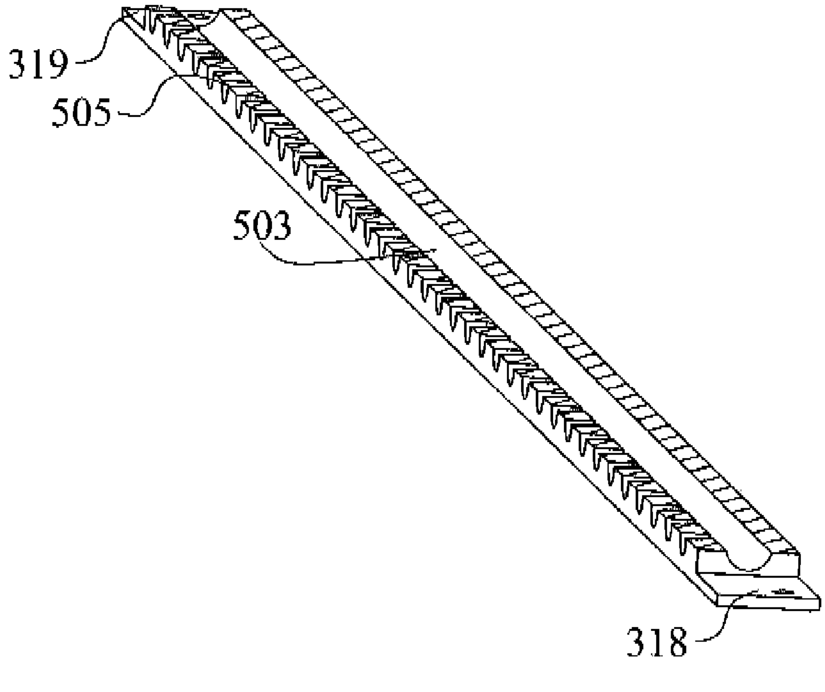
FIG. 5A is a three-dimensional drawing of the second flow-guiding component in FIG. 3, cut in a radial direction.
Figure 5B:
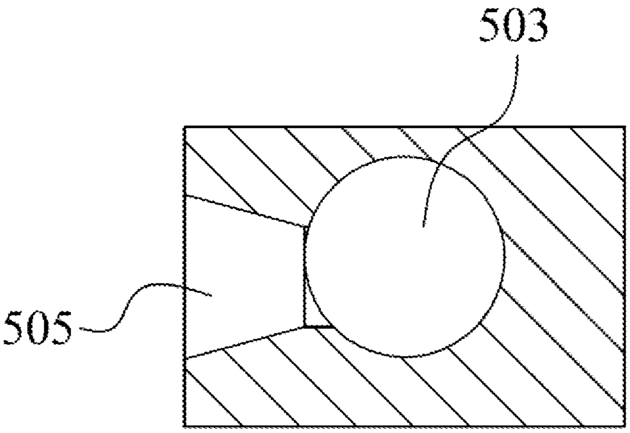
FIG. 5B is an axial sectional drawing of the second flow-guiding component in FIG. 3.

FIG. 5A is a three-dimensional drawing of the second flow-guiding component in FIG. 3, cut in a radial direction; FIG. 5B is an axial sectional drawing of the second flow-guiding component in FIG. 3, cut along line B-B. As shown in FIGS. 3 and 5A-5B, similarly to the first flow-guiding component 103, the second flow-guiding component 104 has a second accommodating cavity 503 and multiple lead-in channels 505, the second accommodating cavity 503 being in communication with the multiple lead-in channels 505. The multiple lead-in channels 505 extend inward (i.e. toward the second accommodating cavity 503) to the second accommodating cavity 503 from the corresponding second gas inlets 304; the two gas outlets 302 are arranged at two ends of the second accommodating cavity 503, and each of the multiple second gas inlets 304 is in communication with the second gas outlets 302 by means of the corresponding lead-in channels 505 and the second accommodating cavity 503. It must be explained that the positions and number of second gas outlets 302 can be set according to design needs; one or more second gas outlets may be provided, and may be arranged in any region of a surface of the second flow-guiding component 104, as long as they are in communication with the second accommodating cavity 503.

As shown in FIG. 5B, in symmetry with the first flow-guiding component 103, the lead-in channel 505 narrows gradually from the corresponding second gas inlet 304 toward the inside, such that the lead-in channel 505 has a flared shape that gradually increases in size from the inside to the outside; this will make it easier to collect gas within a large range above the electronic component. Likewise, the lead-in channel 505 need not have a regular flared shape, as long as the height in a length direction perpendicular to the second track component 102 gradually decreases from the outside to the inside; that is to say, the effect of facilitating gas collection can be achieved if the lead-in channel 505 gradually decreases in size from the inside to the outside in an axial cross section of the second flow-guiding component 104. It must be explained that the lead-in channel 505 of the second flow-guiding component 104 may also be a channel of uniform internal diameter; this is because the shape of the lead-out channel 405 of the first flow-guiding component 103 can already ensure that clean gas can spread to the region above the electronic component, meeting the needs of processing, and the second flow-guiding component 104 only needs to be able to guide this portion of gas to flow out.

Figure 6:
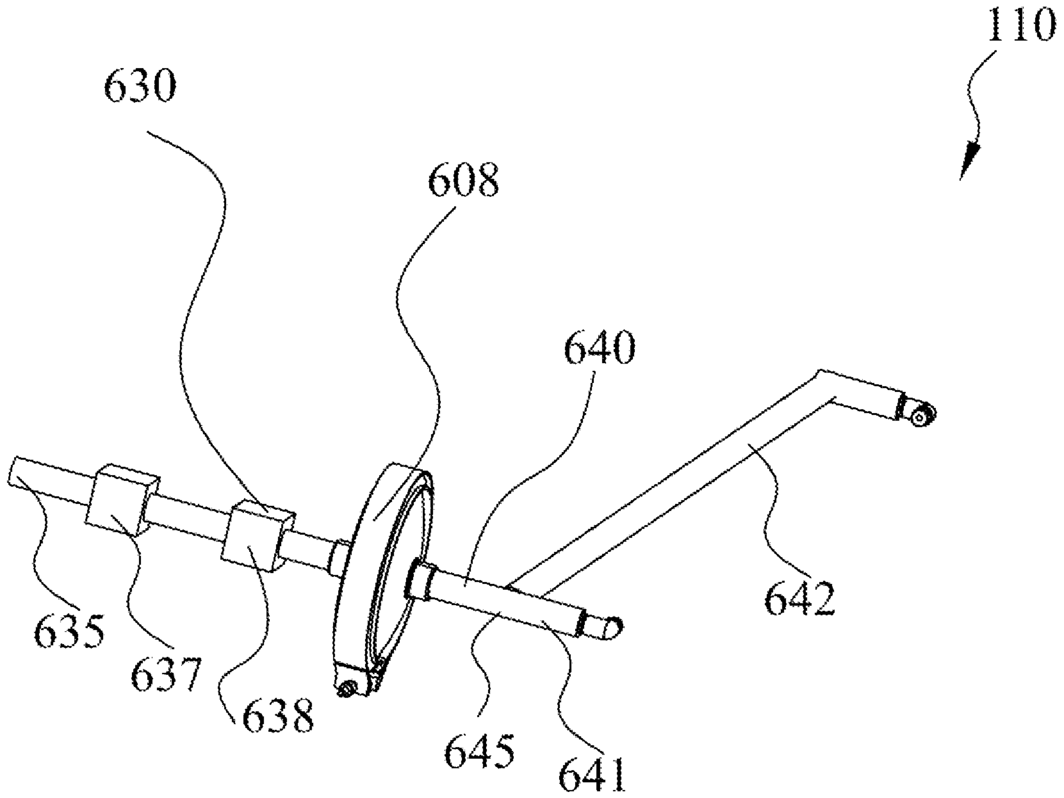
FIG. 6 is a three-dimensional drawing of the gas delivery assembly in FIG. 1B.

FIG. 6 is the gas delivery assembly 110 in FIG. 1B; as shown in FIG. 1B, the gas delivery assembly 110 comprises an air filtration apparatus 608, an inlet end 630 and an outlet end 640. The inlet end 630 has one end in communication with the air filtration apparatus 608 and another end in communication with a blowing apparatus, in order to deliver air into the air filtration apparatus 608. The inlet end 630 comprises an inlet duct 635, and a flow regulating valve 637 and a pressure regulating valve 638 which are connected on the duct and configured to regulate the flow rate and pressure, respectively, of gas entering the air filtration apparatus 608. The outlet end 640 comprises an outlet duct 645; the outlet duct 645 comprises a main pipe 641 and a branch pipe 642, wherein the main pipe 641 has one end in communication with the air filtration apparatus 608, and another end in communication with one of the first gas inlets 202 of the first flow-guiding component 103; the branch pipe 642 has one end in communication with the main pipe 641, and another end in communication with the other of the first gas inlets 202 of the first flow-guiding component 103. Thus, air in the environment becomes clean air after filtration by the air filtration apparatus 608, and the clean air is delivered into the first flow-guiding component. It must be explained that the first flow-guiding component 103 could also be in direct communication with a high-pressure clean air source, in which case there would be no need to further provide a blowing apparatus and an air filter. The technical effect of the present application can be achieved as long as the gas entering the first flow-guiding component 103 is clean air having a certain pressure.

Figure 7:
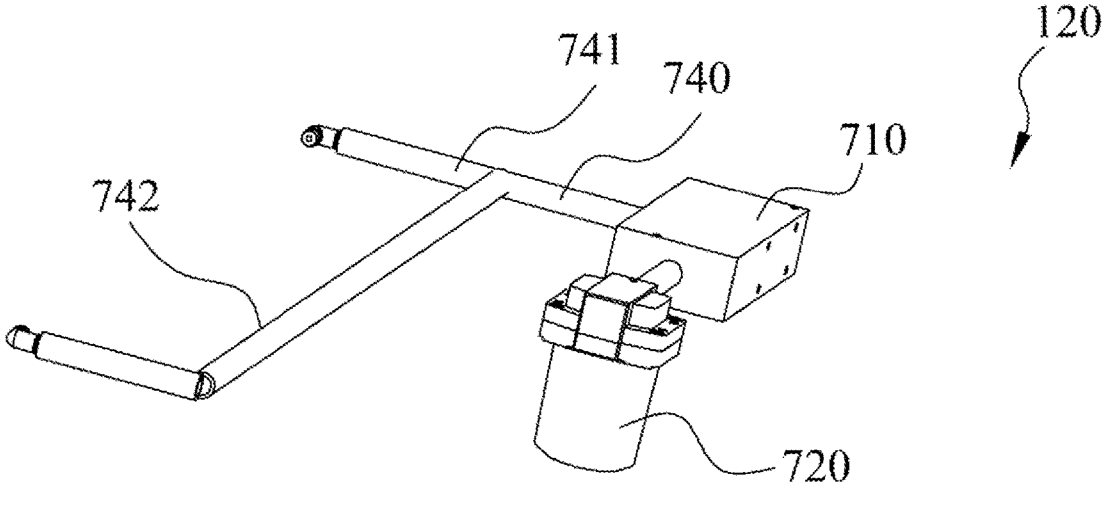
FIG. 7 is a three-dimensional drawing of the gas discharge assembly in FIG. 1B.

FIG. 7 is a three-dimensional drawing of the gas discharge assembly 120; as shown in FIG. 7, the gas discharge assembly 120 comprises a gas discharge duct 740, a vacuum generator 710 and a gas treatment apparatus 720. The gas discharge duct 740 comprises a main pipe 741 and a branch pipe 742, wherein the main pipe 741 has one end in communication with the vacuum generator 710, and another end in communication with the second gas outlet 302 of the second flow-guiding component 104; the branch pipe 742 has one end in communication with the main pipe 741, and another end in communication with the second gas outlet 302. The vacuum generator 710 can form a certain degree of vacuum in the second flow-guiding component, and thereby guide gas to flow out through the gas outlets 302 of the second flow-guiding component. The gas treatment apparatus 720 is in communication with the vacuum generator 710, and is configured to filter and treat the gas flowing out of the second flow-guiding component 104. The gas treatment apparatus 720 may be arranged outside the dispensing apparatus. In an embodiment of the present application, the vacuum generator is a Venturi tube, which is in communication with the gas discharge duct 740 and an external high-pressure gas source separately to generate a degree of vacuum. In other embodiments, the vacuum generator could also be a vacuum pump or another gas discharge apparatus.

Figure 8A:
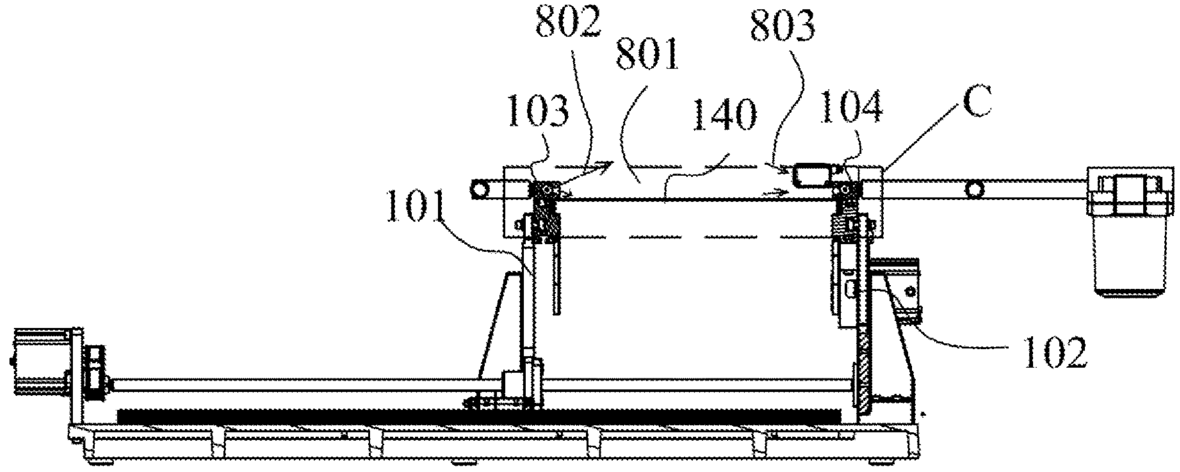
FIG. 8A is a sectional view of the part of the dispensing apparatus in FIG. 1A.
Figure 8B:
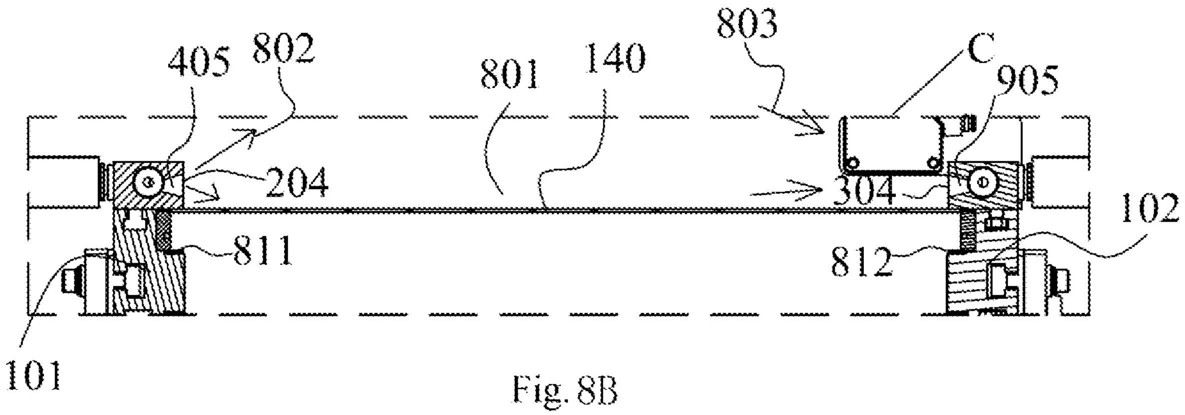
FIG. 8B is a partial enlarged drawing of part C in FIG. 8A.

FIG. 8A is a sectional view of the dispensing apparatus in FIG. 1A; FIG. 8B is a partial enlarged drawing of part C of the dispensing apparatus in FIG. 8A. As shown in FIGS. 8A and 8B, the first track component 101 and the second track component 102 comprise a first conveyor belt 811 and a second conveyor belt 812 respectively; the electronic component 140 is carried and transported by the first conveyor belt 811 and second conveyor belt 812. When the first conveyor belt 811 and second conveyor belt 812 have transported the electronic component 140 to a processing position, a clamping component (not shown in the figures) lifts the electronic component 140 upward, until edges at two sides of the electronic component 140 abut lower parts of the first flow-guiding component 103 and second flow-guiding component 104, at which time the electronic component 140 no longer moves, and the dispensing assembly (not shown in the figures) located above the electronic component 140 dispenses fluid onto an upper surface of the electronic component 140. When the electronic component 140 has been processed, the clamping component (not shown in the figures) moves downward, such that the electronic component 140 comes into contact with the first conveyor belt 811 and second conveyor belt 812 again, and is thereby transported away from the dispensing apparatus. In this embodiment, the distance between the first inner side part 214 of the first flow-guiding component 103 and the second inner side part 314 of the second flow-guiding component 104 is less than the width of the electronic component 140, such that the first flow-guiding component 103 and second flow-guiding component 104 cooperate with the clamping component (not shown in the figures) to fix the electronic component 140 at the position where processing is to be performed. In another embodiment, the electronic component 140 may also be fixed at the position where processing is to be performed through the cooperation of another corresponding mechanical structure with the clamping component (not shown in the figures), while the first flow-guiding component 103 and second flow-guiding component 104 are not in contact with the electronic component 140 to be processed, but the width between the first flow-guiding component 103 and second flow-guiding component 104 is substantially similar to the width of the electronic component to be processed. A sensible distance between the first flow-guiding component 103 and second flow-guiding component 104 can ensure that the clean air region above the electronic component 140 spreads as little as possible to peripheral regions where clean air is not needed while meeting the processing needs of the electronic component 140, to reduce the amount of clean air used.

In another embodiment, the first track component 101 and second track component 102 need not comprise a conveyor belt; the electronic component 140 may be grabbed by means of a corresponding mechanical apparatus in order to place the electronic component 140 in the position where processing is to be performed.

When the electronic component 140 has reached the position where processing is to be performed and been clamped, clean gas is discharged through the first gas outlets 204 of the first inner side part 214 of the first flow-guiding component 103; since the lead-out channels 205 are flared, the gas flows out in the directions indicated by arrows 802, thereby forming a clean gas region 801 above the electronic component 140; most of the gas in the clean gas region 801 is sucked in through the second inner side part 314 of the second flow-guiding component 104 along arrows 803, and is discharged after being treated in the gas treatment apparatus 720. Due to the cooperation of the first flow-guiding component 103 and second flow-guiding component 104, the clean gas region 801 formed above the electronic component 140 is relatively concentrated; the clean gas region 801 is a region where a dispensing component dispenses fluid during processing, and the clean gas region 801 can ensure the quality of processing. The cooperation of the first flow-guiding component 103 and second flow-guiding component 104 results in the range of the clean gas region being small and relatively concentrated, avoiding the spreading of clean gas to other unnecessary regions, such that the utilization rate of clean gas is high and the amount of clean gas used is small, so that energy loss can be reduced.

Although only some features of the present application have been shown and described herein, many improvements and changes could be made by those skilled in the art. Thus, it should be understood that the attached claims are intended to encompass all of the abovementioned improvements and changes which fall within the scope of the essential spirit of the present application.

What is claimed is:

1. A dispensing apparatus for processing an electronic component, comprising:

a first track component and a second track component, the first track component and the second track component being arranged in parallel, and being configured to carry an electronic component to be processed;

a first flow-guiding component and a second flow-guiding component, the first flow-guiding component being arranged at the top of the first track component, the second flow-guiding component being arranged at the top of the second track component, the first flow-guiding component including an elongated structure having a first end, a second end, and a first inner side part, the second flow-guiding component including an elongated structure having a third end, a fourth end, and a second inner side part, the first inner side part and the second flow-guiding component inner side part being arranged facing toward each other;

wherein the first flow-guiding component has two first gas inlets and at least one first gas outlet in communication with each other, the two first gas inlets being configured to be in communication with a clean gas source, and the at least one first gas outlet being arranged at the first inner side part of the first flow-guiding component, the second flow-guiding component has at least one second gas inlet and two second gas outlets in communication with each other, the at least one second gas inlet being arranged at the second inner side part of the second flow-guiding component, and the two second gas outlets being configured to be in communication with a vacuum generator, so that clean gas can flow toward the at least one second gas inlet from the at least one first gas outlet, thereby forming a clean gas region above the electronic component to be processed, wherein the two first gas inlets of the first flow-guiding component includes a first gas inlet provided in the first end of the first flow-guiding component and a second gas inlet provided in the second end of the first flow-guiding component, the first gas inlet and the second gas inlet being configured to be in communication with the clean gas source, and the two second gas outlets of the first flow-guiding component extend along a length of the first inner side part of the first flow-guiding component, wherein the at least one second gas inlet of the second flow-guiding component includes one or more second gas inlet extending along a length of the second inner side part of the second flow-guiding component and the two second gas outlets includes a third gas outlet provided in the third end of the second flow-guiding component and a fourth gas outlet provided in the fourth end of the second flow-guiding component, the third gas outlet and the fourth gas outlet being configured to be in communication with the vacuum generator, wherein the first flow-guiding component has at least one lead-out channel corresponding to the at least one first gas outlet respectively, the at least one lead-out channel being formed to extend into the interior of the first flow-guiding component from the at least one first gas outlet, and the height of the lead-out channel, in a length direction perpendicular to the first track component, gradually decreasing from the at least one first gas outlet toward the inside, wherein the first flow-guiding component has a first accommodating cavity, the first accommodating cavity extending in the length direction of the first flow-guiding component and being in communication with the first gas inlet and the second gas inlet and the at least one lead-out channel, wherein the second flow-guiding component has at least one lead-in channel corresponding to the at least one second gas inlet, the at least one lead-in channel being formed to extend into the interior of the second flow-guiding component from the second gas inlet, and the height of the at least one lead-in channel in a length direction perpendicular to the second track component gradually decreasing from the second gas inlet toward the inside, and wherein the second flow-guiding component has a second accommodating cavity, the second accommodating cavity extending in the length direction of the second flow-guiding component and being in communication with the third gas outlet and the fourth gas outlet of the two second gas outlets and the at least one lead-in channel.

2. The dispensing apparatus as claimed in claim 1, wherein the at least one first gas outlets comprises multiple gas outlets, and a distance between outer sides of the first and the last of the multiple gas outlets in the length direction of the first flow-guiding component is greater than or equal to a length of the clean gas region of the dispensing apparatus.

3. The dispensing apparatus as claimed in claim 1, wherein the at least one second gas inlet comprises multiple gas inlets and multiple lead-in channels corresponding to the at least one first gas outlets respectively, the multiple gas inlets being distributed in the length direction of the second flow-guiding component.

4. The dispensing apparatus as claimed in claim 1, wherein a distance between the first inner side part of the first flow-guiding component and the second inner side part of the second flow-guiding component is less than a width of the clean gas region of the dispensing apparatus.

5. The dispensing apparatus as claimed in claim 1, further comprising an air filtration apparatus, the air filtration apparatus comprising an inlet end and an outlet end, the inlet end being in communication with an air source, the outlet end being in communication with the first gas inlet and the second gas inlet of the first flow-guiding component.

6. The dispensing apparatus as claimed in claim 1, further comprising a gas treatment apparatus, the gas treatment apparatus being in communication with the third gas outlet and the fourth gas outlet of the two second gas outlets, and the gas treatment apparatus being capable of purifying air flowing out of the two second gas outlets.

* * * * *